Oct. 29, 1940.  M. S. ROSS  2,219,533
HAULING UNIT
Filed Feb. 7, 1938  2 Sheets-Sheet 1
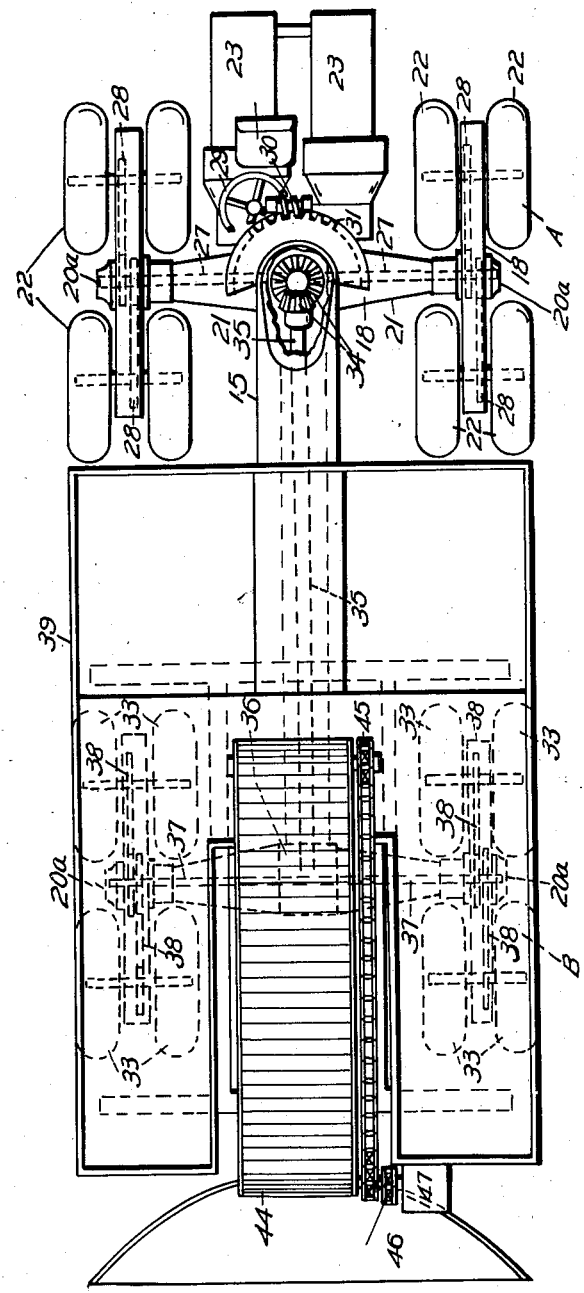
INVENTOR.
MATTHEW S. ROSS
BY Rollandet, McGrew & Campbell
ATTORNEYS.

Oct. 29, 1940.   M. S. ROSS   2,219,533
HAULING UNIT
Filed Feb. 7, 1938   2 Sheets-Sheet 2
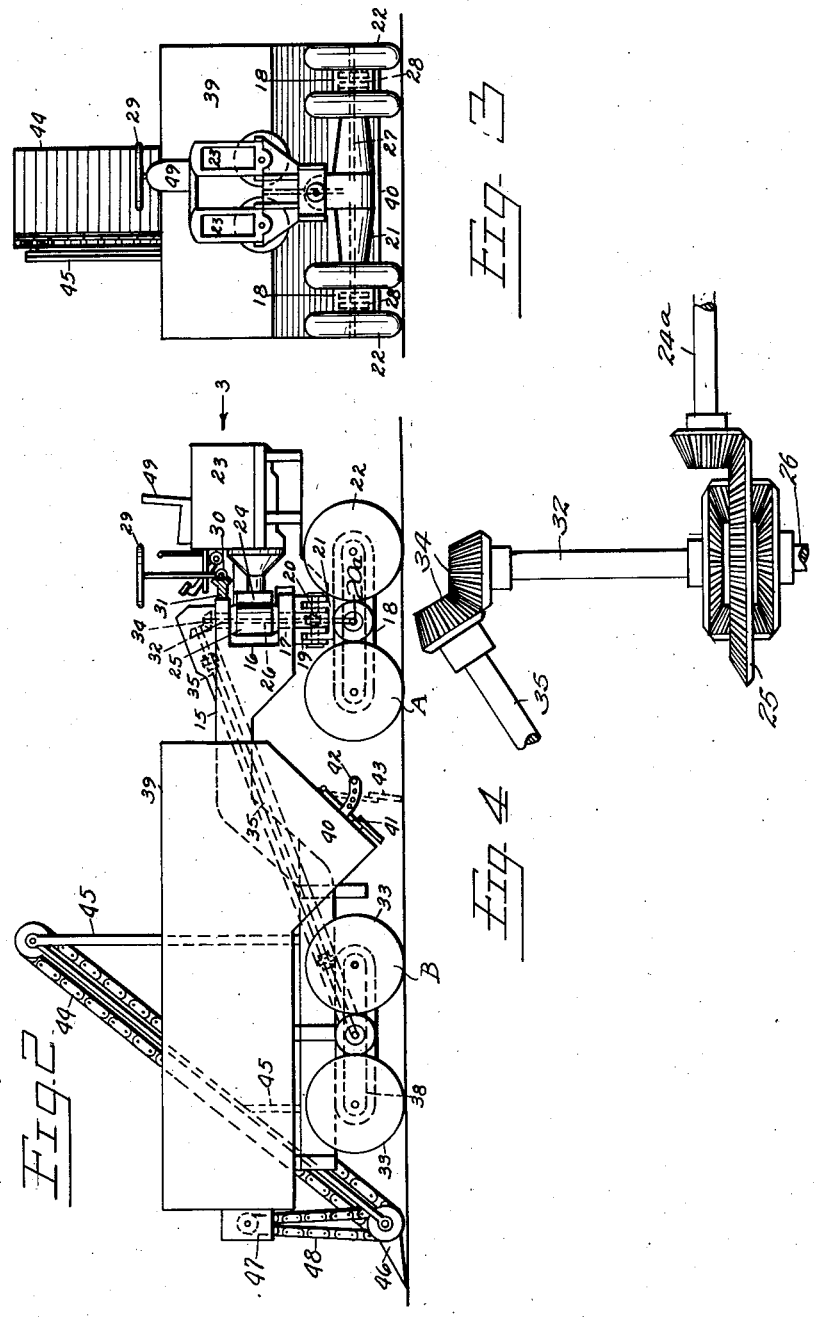
INVENTOR.
MATTHEW S. ROSS
BY
ATTORNEY.

Patented Oct. 29, 1940

2,219,533

UNITED STATES PATENT OFFICE 2,219,533

HAULING UNIT

Matthew S. Ross, Riverton, Wyo.

Application February 7, 1938, Serial No. 189,114

2 Claims. (Cl. 180—14)

This invention relates to improvements in hauling units, more particularly for moving earth.

An object of the invention is to provide a steerable self-propelled hauling unit that transmits driving power to all wheels, in a novel manner.

Another object is the provision of such a unit that has an earth-carrying body adjacent a normally rear end to facilitate loading.

A further object is to provide a device of this character that is self-loading.

A still further object is the provision of an earth-hauling unit of this kind that is provided with means for dumping and spreading earth on a fill, grade or the like.

Still another object is to provide a self-propelled chassis for general hauling purposes that carries its motive power on a set of wheels that are pivoted to the chassis so that motor and wheels move about the pivotal axis in unison for steering purposes.

Other objects and advantages reside in details of design and construction that will be disclosed in the following description and in the drawings wherein like parts have been similarly designated and in which:

Figure 1 is a general plan view of a hauling unit built according to this invention;

Figure 2 is a side elevation of the same; and

Figure 3 is an end elevation as indicated by arrow 3 in Figure 2.

Figure 4 is a fragmentary diagrammatic illustration of some of the power transmission mechanism shown in Figures 1, 2 and 3, and drawn to a larger scale.

In the drawings reference character 15 denotes a frame member having a vertically bifurcated end at 16, that is pivoted on a king pin 17, carried on a normally forward wheeled truck 18 that supports the bifurcated end of the frame member on a turntable bearing 19, that is pivoted horizontally at 20 to an axle-carrying housing 21.

The truck 18 has a wheel assembly A comprising a plurality of wheels 22, all of which are driven by a suitable source of power, such as motors 23 carried on the truck. The frame member 15 has a wheel assembly B composed of a plurality of wheels 33, each of which also is driven by the motors 23. In order to provide an improved system for differentially distributing and transmitting driving power from the motors 23 to each and every wheel of the unit, a transmission assembly 24 transmits power from said motors 23 to an axially vertical differential 25 that is positioned at the pivotal axis of the king pin 17, or in other words, at the pivotal axis of the connection between the frame member 15 and the truck 18. In the vertically disposed differential 25, driving power is divided and differentially distributed along the normal longitudinal center line of the unit to an axially horizontal differential positioned between the right and left wheels of wheel assembly A and to another axially horizontal differential between the right and left wheels of wheel assembly B. Thence, power is distributed laterally and differentially through and from said horizontal differentials to all of the right and left hand wheels of the unit. Power is distributed to the wheel assembly A from the vertical differential 25 through the intermediary of a vertical shaft 26, differentially related horizontal axle shafts 27 and chain drives 28. The motors 23 and the transmission mechanism 24 turn in unison with the truck 18 about the king pin 17 for steering, which movement is effected by a hand wheel 29, or by a power take-off, not shown, acting through the intermediary of a worm 30 on the truck and a worm wheel sector 21 on the frame.

The diagrammatic illustration that is Figure 4, represents a typical vertical differential that may be used in the power distributing system. Power from the dual motors 23 may be transmitted to a drive shaft 24a simultaneously through sprocket chains, not shown, and subject to individual conventional clutch control, not shown, since these features are no particular part of the present invention and are well-known to those skilled in the art. A single motor may be directly connected to the drive shaft 24a, subject to conventional clutch control, if preferred. Drive shaft 24a, which is a portion of the transmission assembly 24, is in geared driving connection with the differential assembly 25.

The axial center of the differential 25 is alined with the pivotal axis of steering rotation of the truck 18, providing for an upwardly extending second drive shaft 32, to transmit driving power to normally rear wheels 33, through the intermediary of bevel gears 34, a rearwardly and downwardly inclined propeller shaft 35, a rearward cross-differential 36, shafts 37 and chain drives 38.

Body 39 is carried on the frame element 15 and has a downwardly projecting V hopper 40 provided with an adjustable dump gate 41 which can be held in a selected position by means such as an arm 42, and which can be extended downwardly as at 43 to provide a scraper blade for leveling and spreading material discharged from the body as the machine is driven in either direction.

A loader or elevator 44 is carried on the frame by means of supporting members 45 and is provided with a scraper 46 to pick up loosened earth or the like so that the loader or elevator 44 can carry the earth up into the body. The loader or elevator 44 is preferably driven by a motor 47 through the intermediary of a chain drive 48 and thus is provided a self-propelled hauling unit which may be driven over loose earth and which will automatically load itself and later will dump its load and spread it as desired by an operator.

A seat for an operator which can be shifted to suit the direction of travel of the unit, is shown at 49, and conventional control levers and pedals for operating a clutch, and the transmission and reversing mechanism are provided, as is usual in self-propelled vehicles.

This novel combination provides a powerful hauling unit that is driven through the intermediary of all of its wheels and which can be steered and turned on an unusually short radius without losing any of its traction or pulling power. The chassis thus provided may be used to haul many devices other than the dump body illustrated, or for a wide variety of purposes. But when equipped with such a loading and hauling body as illustrated, it may be conveniently used to save labor and combine the functions of a Fresno scraper, a dump truck and a "bulldozer" or earth spreader, in one unit and in one operation.

The terms "forward" and "rear" are used for convenience in describing the operation of the present invention, and it is, of course, to be understood that the chassis is reversible by means of well-known reverse and transmission gearing, and it will drive and steer in either direction of travel.

The elevating mechanism may be made adjustable as to its angle of elevation and also removable or collapsible so that the body can be loaded by other means, such as a power shovel or drag line, when preferred.

The rear part of the body can be made raisable by means of a hoist or other suitable mechanism so that material therein can be slid to the hopper 40 for dumping.

The unit is normally driven toward the loader or elevator when being loaded and in the other direction when traveling otherwise. While dual motors are illustrated, it is to be understood that one motor may be sufficient according to working conditions and the size of the unit.

The chassis carries its load distributed among all of the wheels, each of which is a power or driving wheel. This arrangement provides an unusually powerful drive for the unit and due to the fact that the truck wheels 22 are transversely pivoted, as at 20, and also pivoted at 20a, they follow closely the contour of uneven ground and therefore drive equally well over a smooth or a rough surface. Furthermore, the distribution of the load over so many driving wheels provides a factor of buoyancy for the unit and prevents it from sinking into soft or wet earth, regardless of extremely heavy loads that it may be carrying.

A conventional dump body or any other type body can be mounted on the chassis or the chassis may be used as a general purpose tractor because of its advantageous features of a powerful drive on all wheels, its ability to be turned or steered without losing traction, and its freedom from miring down when traveling over a soft surface.

What I claim and desire to secure by Letters Patent is:

1. A hauling unit of the character described comprising a frame having a bifurcated end, wheels for the other end thereof, a power truck inclusive of driving wheels pivotally attached to said frame and positioned to support the bifurcated end thereof, a motor on the power truck, motor-driven differential power transmission mechanism mounted in the bifurcation of the frame and at the pivotal axis of said truck, means for transmitting driving power from said differential to the truck wheels, means for transmitting driving power from said differential to the wheels on the frame, and mechanism for turning the truck about its pivotal axis for steering the unit.

2. A hauling unit comprising a frame, having a bifurcated end, a wheel assembly, inclusive of right and left wheels, for the frame, a power truck inclusive of a motor, pivotally connected with the bifurcated end of said frame, a wheel assembly, inclusive of right and left wheels, for the power truck, an axially vertical differential at the pivotal axis of the connection of the truck with the frame, axially horizontal differentials for the respective wheel assemblies between the right and left wheels thereof, and means for transmitting driving power along the longitudinal center line of the unit, from said motor differentially through said vertical differential to said horizontal differentials, and thence laterally to each wheel through the intermediary of said horizontal differentials.

MATTHEW S. ROSS.